(12) United States Patent
Niewczas

(10) Patent No.: US 11,640,548 B2
(45) Date of Patent: May 2, 2023

(54) USER IDENTIFICATION WITH VOICEPRINTS ON ONLINE SOCIAL NETWORKS

(71) Applicant: Meta Platforms, Inc., Menlo Park, CA (US)

(72) Inventor: Mateusz Marek Niewczas, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/896,623

(22) Filed: Aug. 26, 2022

(65) Prior Publication Data

US 2022/0405625 A1    Dec. 22, 2022

Related U.S. Application Data

(63) Continuation of application No. 16/740,285, filed on Jan. 10, 2020, now Pat. No. 11,475,344, which is a
(Continued)

(51) Int. Cl.
*G06N 7/00* (2006.01)
*H04L 67/306* (2022.01)
(Continued)

(52) U.S. Cl.
CPC ............ *G06N 7/005* (2013.01); *G06Q 50/01* (2013.01); *G10L 17/06* (2013.01); *G10L 17/22* (2013.01); *H04L 43/16* (2013.01); *H04L 67/02* (2013.01); *H04L 67/306* (2013.01); *H04L 67/52* (2022.05); *H04W 12/63* (2021.01)

(58) Field of Classification Search
CPC ......... H04L 43/00–43/16; H04L 67/00–67/52; H04W 12/60–12/63; G06N 7/00–7/08; G06Q 50/01; G10L 17/00–17/22
See application file for complete search history.

(56) References Cited

U.S. PATENT DOCUMENTS

2005/0222846 A1* 10/2005 Tomes .................... H04L 12/66
704/275
2009/0150320 A1* 6/2009 Geppert .................. G06F 21/31
726/4

(Continued)

*Primary Examiner* — Clayton R Williams
(74) *Attorney, Agent, or Firm* — Baker Botts L.L.P.

(57) ABSTRACT

In one embodiment, a method includes, by one or more computing devices of an online social network, receiving, from a client system of a first user and from a second user, a biometric input used to identify the second user, sending, to the client system, a personal identifier for presentation to the second user, receiving, from the client system in response to the presentation of the personal identifier to the second user, an audio input from the second user, determining, based on a comparison of the audio input to a voiceprint of the second user, wherein the voiceprint comprises audio data for auditory identification of the second user, whether the audio input comprises the personal identifier spoken by the second user, and authenticating the second user to access an online account associated with the second user via the client system if the audio input is determined to be spoken by the second user and comprise the personal identifier spoken by the second user.

20 Claims, 7 Drawing Sheets

Related U.S. Application Data continuation of application No. 15/386,393, filed on Dec. 21, 2016, now Pat. No. 10,607,148.

(51) Int. Cl.

| | | |
|---|---|---|
| *H04L 43/16* | (2022.01) | |
| *H04L 67/02* | (2022.01) | |
| *G06Q 50/00* | (2012.01) | |
| *G10L 17/22* | (2013.01) | |
| *G10L 17/06* | (2013.01) | |
| *H04W 12/63* | (2021.01) | |
| *H04L 67/52* | (2022.01) | |

(56) References Cited

U.S. PATENT DOCUMENTS

| | | | |
|---|---|---|---|
| 2014/0139318 A1* | 5/2014 | Malpani | G06F 21/32 |
| | | | 340/5.82 |
| 2014/0259138 A1* | 9/2014 | Fu | H04L 63/0861 |
| | | | 726/7 |
| 2017/0124311 A1* | 5/2017 | Li | G10L 15/26 |
| 2017/0244701 A1* | 8/2017 | Su | G06F 21/36 |

\* cited by examiner

USER IDENTIFICATION WITH VOICEPRINTS ON ONLINE SOCIAL NETWORKS

PRIORITY

This application is a continuation under 35 U.S.C. § 120 of U.S. patent application Ser. No. 16/740,285, filed Jan. 10, 2020, which is a continuation under 35 U.S.C. § 120 of U.S. patent application Ser. No. 15/386,393, filed 21 Dec. 2016 and issued as U.S. Pat. No. 10,607,148, which are incorporated herein by reference.

TECHNICAL FIELD

This disclosure generally relates to using voice recognition in a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

Speech-recognition systems may allow a user to dictate and have speech transcribed as written text, have a document synthesized as an audio stream, or issue commands that are recognized as such by the system. Speech-recognition systems typically use statistical models to determine the most likely sequences of words that correspond to a given portion of speech received by a computer system as audio input. The models may include one or more of hidden Markov models, neural networks, deep learning models, and the like. The received audio input may be encoded into digital data at a particular sampling rate, e.g., 16, 44.1, or 96 kHz, and with a particular number of bits representing each sample, e.g., 8, 16, of 24 bits. The audio input is processed by an acoustical model, which is a model of the relationship between audio signals and the sounds of phonetic units in the language. A language model then determines the most likely phrase that corresponds to the identified phonetic units for a particular audio input. The language model may be a model of the probabilities that various word sequences may occur in the language. The sounds of the phonetic units in the audio input are matched with word sequences using the language model, and greater weights are assigned to the words sequences that are more likely to be phrases in the language. The word sequence having the highest weight is then selected as the text that corresponds to the audio input.

The acoustical model may be generated using training input data such as training speech received as audio input and the corresponding phonetic units that correspond to the speech. The acoustical model may be trained or refined using the voice of a particular user, in which case the model may be used to recognize that user's speech. The acoustical model may be trained using a larger sample that includes the voices of many users to produce a speaker-independent model that capable of recognizing the voices of users for whom it has not been trained. The language model may be generated based on phrases in the language to be recognized by the language model.

In addition, voice profiles can be generated for individual users to store data specific to each individual user for use in recognizing each individual user's speech. The voice profile information may include parameters such as the user's default language or a speaker-dependent model generated based on that user's voice. The voice profiles can be accessed through different computers in a networked environment, although the audio hardware and configuration may need to be similar or identical on both machines.

SUMMARY OF PARTICULAR EMBODIMENTS

A social-networking system may record and analyze a user's voice to determine a digital voiceprint for the user. Privacy settings may allow users to opt in or opt out of having the social-networking system record or analyze the user's voice, or having the social-networking system determine the voiceprint for the user. The user's privacy settings also may specify that such voiceprints may be used only to facilitate voice-input purposes (e.g., to send voice messages, to improve voice recognition in order to use voice-operated features of the online social network), and further specify that such voiceprints may not be shared with any third-party system or used by other processes or applications associated with the social-networking system. The voiceprint may be received by a client system, stored on the social-networking system, and used to determine whether subsequently-received audio input is spoken by the same user. The social-networking system may use the voiceprint to identify or authenticate a user based on audio input, and then perform actions based on voice commands in the audio input. For example, a user at a client system, such as a smartphone, may establish a voiceprint by speaking several words or phrases into a microphone of the smartphone, which may record the user's speech as audio input. A voiceprint may be generated based on the audio input and stored in the data store as the user's voiceprint. Subsequently, when that user speaks a voice command such as "play music" into a smartphone or other client system, the voice command may be compared with the user's voiceprint to identify the user as the speaker. The smartphone may then perform an action associated with the command using the user's identity, e.g., playing music from the user's music library. Additionally, the social-networking system may use the user's social-networking information when identifying or authenticating the user based on the voiceprint, and when performing actions based on voice commands.

In particular embodiments, the social-networking system may receive, from a client system of a first user of the online social network, an audio input from an unknown user, identify one or more candidate users of the online social network who are within a threshold degree of separation of the first user, calculate, for each candidate user, a probability that the unknown user is the candidate user, wherein the probability is based on a comparison of the audio input to a voiceprint of the candidate user stored by the online social network, and identify one of the candidate users as being the unknown user based on the calculated probability scores of the candidate users. Privacy settings may allow users to opt in or opt out of having the social-networking system identify them based on voiceprint analysis. In particular embodiments, the social-networking system may receive an audio input from an unknown user who is not associated with a voiceprint, and associate the audio input with a particular social-networking user and a probability that the audio input was spoken by the candidate user. A voiceprint may then be generated for the unknown user based on the audio input and associated with the candidate user and the probability. The candidate user and the probability may be identified by correlating where or when the audio input was received with the candidate user's social-networking information and information about any known users who may be connected to the candidate user in the social-networking system and/or located at or near the location of the candidate user.

In particular embodiments, the social-networking system may use a user's voiceprint to authenticate the user to a client system associated with a the social-networking system. Privacy settings may allow users to opt in or opt out of allowing authentication to the social-networking system based on voiceprint analysis. For example, a user's voiceprint may be used as part of a two-factor authentication process involving (1) determining a user's identity based on biometric identification and/or social-networking information, and (2) verifying the user's identity based on a voiceprint match. This biometric voiceprint authentication process may be more secure than biometric authentication based solely on sampling physical characteristics such as thumb or retina scans. This process may also be more frictionless and convenient for users than password-based authentications, since speaking an authentication code is easier than inputting a password, passcode, or PIN. The biometric voiceprint authentication process can be used to authenticate a user so that the user can access an application or content, such as their online social-network feed, on the client system.

In particular embodiments, the social-networking system may identify users from their voiceprints and provide customized content to the identified users. Privacy settings may allow users to opt in or opt out of having the social-networking system identify them or customize content for the user based on voiceprint analysis. A client system associated with the social-networking system may detect one or more people speaking, and the people speaking may be identified as users based on comparison of their voices to voiceprints stored by the social-networking system. Upon identifying one or more of the people as users of the social-networking system, the social-networking system may provide customized content to the identified users based on their social-networking information. The customized content may be personalized to match the interests of the identified users, and may include advertisements, news feeds, push notifications, place tips, coupons, or suggestions.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
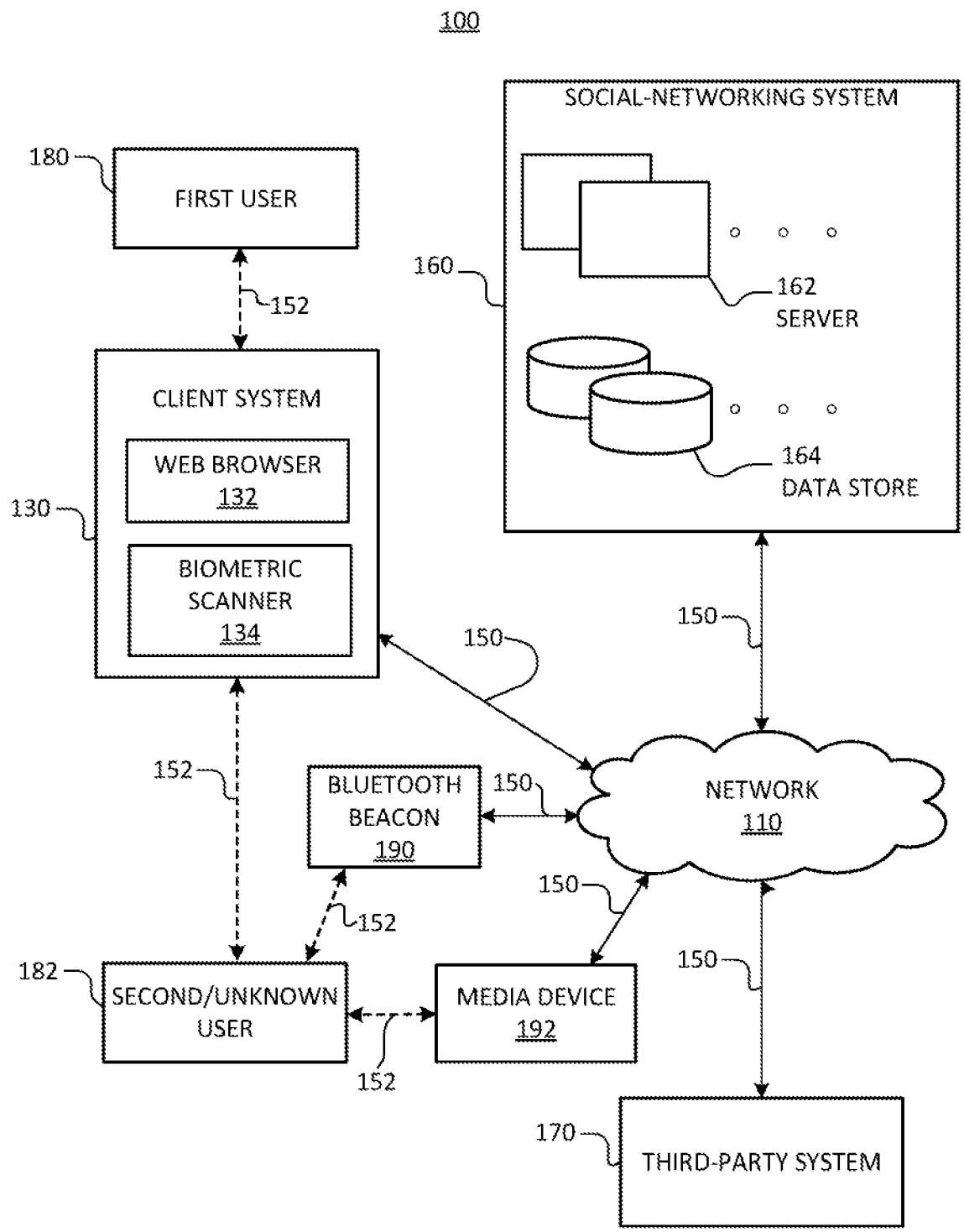
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes-which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
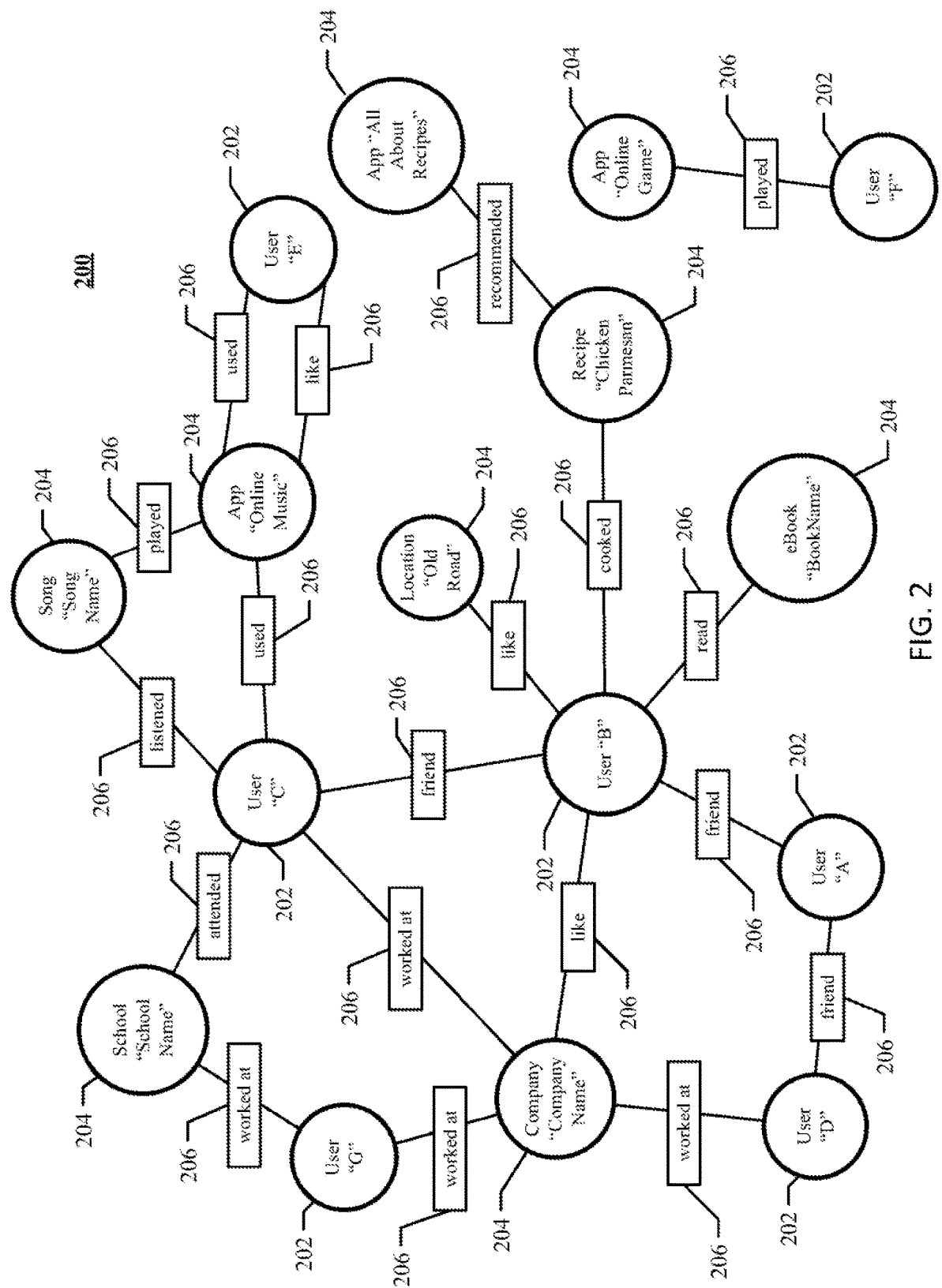
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PUP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("SongName") using a particular application (a third-party online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (the third-party online music application) on an external audio file (the song "SongName"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "online music application").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends sta," then the social-networking system 160 may suggest, for example, "friends stateford," "friends stateford university," "friends stanley," "friends stanley lastname," "friends stateley cup," and "friends stanlonski." In this example, the social-networking system 160 is suggesting the keywords which are modifications of the ambiguous n-gram "sta," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to School "School Name," for example by like- or attended-type edges 206. The querying user may also have a friend named Stanley LastName. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Voice Printing Multi-User Recognition

In particular embodiments, referring to FIG. 1, a first user 180 may use and interact, directly or indirectly, with the client system 130. The first user may be an owner, primary user, or registered user of the client system 130. The client system 130 may receive audio input 152, for example, via a microphone (not shown) from the first user 180. The audio input 152 may include, for example, words, numbers, or phrases spoken by the first user 180. The client system 130 may include or interface with a biometric scanner 134 that receives biometric data such as fingerprint scans, retina scans, iris scans, or the like from a user such as the first user 180 or a second user 182. The second user 182 may communicate with the client system 130 via audio input 152, which may include, for example, words, numbers, or phrases spoken by the second user 182. Thus, a user's voice may be received as audio input by a client system 130 and processed by the client system 130 and/or by one or more servers 162 of the social-networking system 160. Audio input received from a user may also be referred to herein as a sample of the user's voice. The identity of the second user 182 may be unknown (and thus may be referred to herein as an "unknown user"), and may be determined by the social-networking system 160 in combination with one or more of the client system 130, BLUETOOTH beacon 190, media device 192, or other suitable systems. The determination of the identity of the second user 182 may be based on the audio input 152 received from the second user 182. The audio input 152 may be received by microphones in listening devices such as the client system 130, a BLUETOOTH beacon 190, or a media device 192. The BLUETOOTH beacon 190 and the media device 192 may communicate with the network 110 via links 150. The media device may be, for example, a dongle that communicates with a television (TV), or other type of device for presenting media such as audio and video.

In particular embodiments, the social-networking system 160 may record and analyze a user's voice to determine a digital voiceprint for the user. Privacy settings may allow users to opt in or opt out of having the social-networking system 160 record or analyze the user's voice, or having the social-networking system 160 determine the voiceprint for the user. The user's privacy settings also may specify that such voiceprints may be used only to facilitate voice-input purposes (e.g., to send voice messages, to improve voice recognition in order to use voice-operated features of the online social network), and further specify that such voiceprints may not be shared with any third-party system 170 or used by other processes or applications associated with the social-networking system 160. The voiceprint may be received by a client system 130, stored on the social-networking system 160, and used to determine whether subsequently-received audio input is spoken by the same user. The social-networking system 160 may use the voiceprint to identify or authenticate a user based on audio input, and then perform actions based on voice commands in the audio input. For example, a user at a client system 130, such as a smartphone, may establish a voiceprint by speaking several words or phrases into a microphone of the smartphone, which may record the user's speech as audio input. A voiceprint may be generated based on the audio input and stored in the data store 164 as the user's voiceprint. Subsequently, when that user speaks a voice command such as "play music" into a smartphone or other client system 130, the voice command may be compared with the user's voiceprint to identify the user as the speaker. The smartphone may then perform an action associated with the command using the user's identity, e.g., playing music from the user's music library. In connection with voice commands, particular embodiments may utilize one or more systems, components, elements, functions, methods, operations, or steps disclosed in U.S. patent application Ser. No. 13/652,767, filed 27 Jul. 2012, which is incorporated by reference.

In particular embodiments, the social-networking system 160 may use the user's social-networking information when identifying or authenticating the user based on the voiceprint, and when performing actions based on voice commands. In particular embodiments, the social-networking system 160 may use social-graph information to disambiguate names in voice commands. For example, if a user named Aren says "Let Matt know I'm running late," and there are several users named Matt, the social-networking system 160 may select an intended user named Matt based on Aren's social-graph connections (e.g., based on an affinity coefficient or a degree of separation between Aren and other users named "Matt"). The social-networking system 160 may automatically send the intended Matt a message that Aren is running late. Alternatively, if there are multiple users named Matt connected to Aren (for example, a Matt #1 and a Matt #2 are both first-degree connections of Aren within social graph 200), and the social-networking system 160 cannot determine who Aren intended to message, the social-networking system 160 may present Aren with options, such as, "Should I notify Matt #1 or Matt #2?" or "Do you mean Matt #1?"

In particular embodiments, a client system 130 associated with the social-networking system 160, e.g., a smartphone, a BLUETOOTH beacon 190, media device 192, or the like, may listen for and detect voices, then apply voiceprint analysis to the detected voices. For example, if Aren and Matt are talking, a client system 130 may isolate Matt's voice, and if Matt's voiceprint is stored in the social-networking system 160, Matt's presence may be detected even though he did not directly interact with the client system 130 or did not perform a check-in. Privacy settings may allow users to opt in or opt out of having the social-networking system 160 identify them based on voiceprint analysis. To improve the accuracy and efficiency of identifying speakers, the social-networking system 160 may use the identities of known speakers to generate a list of potential candidates for the unknown speakers. For example, if Aren has checked-in or has been identified by the client system 130 (e.g., because the device is Aren's mobile phone), the social-networking system 160 may identify Matt as being the unknown speaker by comparing Matt's captured voice to voiceprints of users connected to Aren in the social-networking system 160, such as friends or friends-of-friends of Aren, thereby reducing the set of potential voiceprints to which the captured voice is compared.

In particular embodiments, the social-networking system 160 may use information about known users to disambiguate voice commands. If Aren speaks the command "Let Matt know I'm running late," then the social-networking system 160 may identify a friend or contact named Matt. A user is unlikely to send such a status update to another user located in the same room. Thus, if the social-networking system 160 determines through voiceprint analysis that Matt #1 is located in same room as Aren, and there are multiple users named Matt, then it is unlikely that Aren wants to notify Matt #1 about being late. The social-networking system 160 thus may disambiguate the voice command by excluding Matt #1 from the list of possible addressees and identifying another user named Matt, e.g., Matt #2, who may have a lower coefficient or a greater degree of separation from Aren than the first-identified Matt. The social-networking system 160 may automatically send a message to Matt #2 indicating that Aren is running late, or may display a message to Aren such as, "Do you mean Matt #2?"

As another example, if Aren speaks the voice command "Let Rosie know the meeting is starting soon," the social-networking system 160 may identify two users named Rosie (e.g., Rosie #1 and Rosie #2) who are connected to Aren, neither of whom is in the room with Aren. If the social-networking system 160 identifies (e.g., through voiceprint analysis) another person in the room, George, who is also connected to Rosie #2 (but not to Rosie #1), then the system 160 may select Rosie #2 because she is connected to both Aren and George. The social-networking system 160 may automatically send a message to Rosie #2, or may send a message to Aren asking whether he is referring to Rosie #2.

In particular embodiments, a client system 130 may restrict or customize the functionality of the device 130 based on voiceprint analysis of a user's voice. Different sets of commands may be available to different users because of access control permissions or other reasons. The social-networking system 160 may use voiceprint matching to identify a user who speaks a command, determine the user's authorization level, and then determine whether to execute each particular voice command spoken by the user. Privacy settings may allow users to opt in or opt out of having the social-networking system 160 identify them based on voiceprint analysis. For example, a user 180 who is an owner of a client system 130 may have unrestricted access to execute commands on the client system 130, but other users 182, such as friends of the owner, may be restricted to executing a limited set of voice commands. Still other users 182, such as friends of friends of the owner or unidentified users, may be prohibited from executing voice commands. For example, if a user 182 says "play music" or "post that clip to my timeline," but the user's voice cannot be identified, e.g., because the voice command received from the user 182 does not match the voiceprint of a known user, then the client system 130 may decline or ignore the command. Alternatively, the client system 130 may require the unidentified user 182 to authenticate before processing the command. For example, the client system 130 may display a message to an unidentified user 182 such as "What is your name?" and/or display a username/password prompt, then authenticate the user 182 based on received voice input. Permission settings may allow a first user to opt in or opt out of having the social-networking system 160 authenticate other users based on voiceprint analysis via the first user's device. In one example, a user 182 who is successfully authenticated may be granted access to a limited set of commands. In another example, an unidentified user 182 may be permitted to execute certain commands that do not access user information or are otherwise unrestricted. For example, the client system 130 may execute commands such as "what is the weather forecast?" or "what time is it?" even if the user 182 speaking the command is not identified or authenticated.

In particular embodiments, the social-networking system 160 may use voiceprint analysis to perform actions based on social-networking information. For example, if a user 182 is connected in a social graph to a user 180 who is an owner of a client system 130, then the client system 130 may allow the user 182 to perform a restricted set of commands or commands that are specific to the user 182. For example, if a user Matt speaks the command "post that clip to my timeline" to another user Aren's smartphone, then the social-networking system 160 may post an associated audio clip to Matt's timeline rather than Aren's, even though the smartphone is Aren's, and/or even if Aren is logged into a social-networking application that processes the voice command on the smartphone. As another example, voice commands to access Aren's social-networking feed spoken by Matt on Aren's smartphone may be denied if Matt does not have permission to access Aren's feed. However, Matt may be permitted to access his own feed on Aren's smartphone, e.g., by speaking a command such as "show me my newsfeed" to Aren's phone.

In particular embodiments, the social-networking system 160 may receive, from a client system 130 of a first user 180 of the online social network, an audio input from a second user 182, wherein the audio input comprises one or more voice commands. In particular embodiments, the second user 182 may be associated with a voiceprint that matches the audio input. In particular embodiments, the social-networking system 160 may identify the one or more voice commands using voice recognition on the audio input. Privacy settings may allow users to opt in or opt out of having the social-networking system 160 perform voice recognition on their audio inputs. In particular embodiments, each voice command may comprise a name of the action associated with the command. In particular embodiments, the second user 182 may be located proximate to the first user 180. A user located proximate to another user may be located in the same room or building or on the same city block as the other user, or within hearing distance of the other user, or within a small distance, e.g., 1, 5, 10, 20 feet, or the like. A location may be located proximate to another location under one or more of the same conditions stated above for a user located proximate to another user. In particular embodiments, the second user 182 may have checked-in at the same location as the first user 180, e.g., checked in at the same restaurant, store, place of business, street address, or the like.

In particular embodiments, the voice command may comprise a name that refers to a plurality of users having the same name, and the social-networking system 160 may determine which of the plurality of users the name refers to based on the second user 182's social-graph connections. For example, the name "Matt" may be disambiguated by selecting a user named "Matt" who is connected to the second user 182 as a friend in the social graph 200. If the second user 182 has multiple friends named "Matt" then other factors may be used to select the closest friend named Matt, e.g., the Matt having the lowest degree of separation from the second user 182, having the greatest affinity coefficient for the second user 182, or having the most friends in common with the second user 182. In particular embodiments, the user to whom the name refers may be determined by comparing a degree of separation between the second user 182 and a first one of the plurality of users to a degree of separation between the second user and the second one of the plurality of users, and selecting the user having the smaller degree of separation as the user the name refers to. In particular embodiments, the user to whom the name refers to may be determined by comparing an affinity coefficient calculated based on the second user 182 and the first one of the plurality of users to an affinity coefficient calculated based on the second user and the second one of the plurality of users, and selecting the user having the greater affinity as the user the name refers to. Although this disclosure describes receiving an audio input in a particular manner, this disclosure contemplates receiving an audio input in any suitable manner.

In particular embodiments, the social-networking system 160 may identify the second user 182 based on a comparison of the audio input to one or more voiceprints stored by the online social network, wherein each voiceprint comprises audio data for auditory identification of a unique user of the online social network. Privacy settings may allow users to opt in or opt out of having the social-networking system 160 identify them based on voiceprint analysis. In particular embodiments, the social-networking system 160 may identify the second user 182 by accessing one or more voiceprints of one or more friends of the first user 180, wherein the one or more voiceprints stored by the online social network comprise the one or more voiceprints of the friends of the first user 180. In particular embodiments, the one or more friends of the first user 180 may be users of the online social network within a single degree of separation of the first user 180 within social graph 200. Although this disclosure describes identifying a user based on a comparison of audio in a particular manner, this disclosure contemplates identifying the user based on a comparison of audio in any suitable manner.

In particular embodiments, the social-networking system 160 may determine a relationship status between the first user 180 and the identified second user 182 within the online social network. The relationship status may be, for example, existence or non-existence of a friend relationship between the two users. Although this disclosure describes determining a relationship status between two users in a particular manner, this disclosure contemplates determining a relationship status between two users in any suitable manner.

In particular embodiments, the social-networking system 160 may determine whether to perform an action associated with each voice command based on permission settings associated with the action and the determined relationship status between the first user 180 and the identified second user 182. In particular embodiments, the social-networking system 160 may determine to perform the action when the permission settings indicate that the second user 182 has permission to perform the action. In particular embodiments, the permission settings may be associated with a user account of the second user 182. In particular embodiments, the social-networking system 160 may determine to perform the action when the determined relationship status indicates that the identified second user 182 is within a threshold degree of separation of the first user 180 on the online social network.

In particular embodiments, the social-networking system 160 may identify the second user 182 as a new user when the audio input does not correspond to the one or more voiceprints, generate a new voiceprint for the second user 182 based on the audio input, and store the new voiceprint in association with the second user 182 for subsequent access by the online social network. Privacy settings may allow users to opt in or opt out of having the social-networking system 160 generate or store voiceprints associated with them.

In particular embodiments, the social-networking system 160 may perform the action associated with each voice command using a user identity associated with the second user 182. In particular embodiments, the voice command may comprise a word referring to the second user 182 and a name of an object on the social network. The word may be the name of the second user 182, e.g., the first name, last name, first and last name, nickname, or the like. The word may alternatively be a pronoun such as he, she, him, her, or the like. In particular embodiments, the social-networking system 160 may identify the object as being associated with the user identity of the second user 182. Although this disclosure describes performing an action associated with a voice command in a particular manner, this disclosure contemplates performing an action associated with a voice command in any suitable manner.

Figure 3:
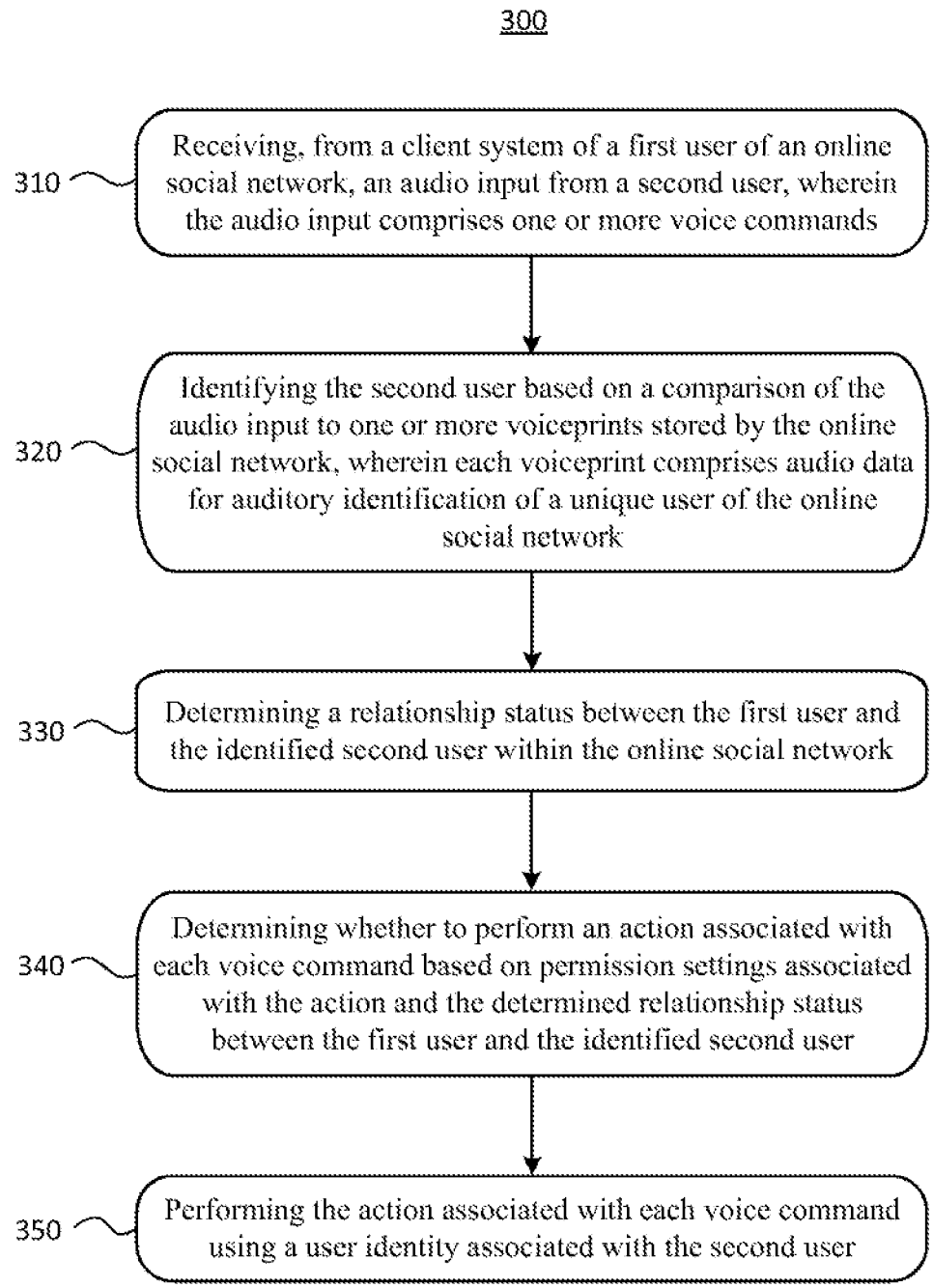
FIG. 3 illustrates an example method for identifying users of a social-networking system based on their voiceprints.

FIG. 3 illustrates an example method 300 for identifying users of a social-networking system 160 based on their voiceprints. The method 300 may begin at step 310, where the social-networking system 160 may receive, from a client system of a first user 180 of an online social network, an audio input from a second user 182, wherein the audio input comprises one or more voice commands. At step 320, the social-networking system 160 may identify the second user 182 based on a comparison of the audio input to one or more voiceprints stored by the online social network, wherein each voiceprint comprises audio data for auditory identification of a unique user of the online social network. Privacy settings may allow users to opt in or opt out of having the social-networking system 160 record or analyze the user's voice, or having the social-networking system 160 perform any voiceprint analysis related to the user. At step 330, the social-networking system 160 may determine a relationship status between the first user 180 and the identified second user 182 within the online social network. At step 340, the social-networking system 160 may determine whether to perform an action associated with each voice command based on permission settings associated with the action and the determined relationship status between the first user 180 and the identified second user 182. At step 350, the social-networking system 160 may perform the action associated with each voice command using a user identity associated with the second user 182. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for identifying users of a social-networking system based on their voiceprints including the particular steps of the method of FIG. 3, this disclosure contemplates any suitable method for identifying users of a social-networking system based on their voiceprints including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Voice Printing Identity Probability

In particular embodiments, the social-networking system 160 may receive, from a client system 130 of a first user 180 of the online social network, an audio input from an unknown user 182, identify one or more candidate users of the online social network who are within a threshold degree of separation of the first user 180, calculate, for each candidate user, a probability that the unknown user 182 is the candidate user, wherein the probability is based on a comparison of the audio input to a voiceprint of the candidate user stored by the online social network, and identify one of the candidate users as being the unknown user 182 based on the calculated probability scores of the candidate users. Privacy settings may allow users to opt in or opt out of having the social-networking system 160 identify them based on voiceprint analysis.

In particular embodiments, the social-networking system 160 may collect audio input from and generate corresponding voiceprints for identified users who do not have voiceprints associated with their social-networking user information. Audio input may be collected by user devices 130, 190, 192 (e.g., the client system 130 may be a user's smartphone, or a TV associated with a media device 192 can be configured to collect voice inputs and send them to the social network for analysis) or by devices located in public places (e.g., a BLUETOOTH beacon 190 located in a store or restaurant). The generated voiceprints may be associated with the corresponding identified users in the social-networking system 160, and the association may subsequently be used to identify the corresponding users or determine probabilities that unidentified or unknown users are the corresponding users. Privacy settings may allow users to opt in or opt out of having the social-networking system 160 associate voiceprints with them or use their voiceprints to identify them or other users based on voiceprint analysis.

In particular embodiments, the social-networking system 160 may receive an audio input from an unknown user 182 who is not associated with a voiceprint, and associate the audio input with a candidate social-networking user and a probability that the audio input was spoken by the candidate user. The probability may also be understood as a probability that the unknown user 182 is the candidate user. A voiceprint may then be generated based on the audio input and associated with the candidate user and the probability. The candidate user and the probability may be determined by correlating where or when the audio input was received with the candidate user's social-networking information and information about any known users who may be connected to the candidate user in the social-networking system 160 and/or located at or near the location of the candidate user. The known users may be understood as "seed" users whose identities may be used to reduce the set of recorded voiceprints that are compared to the audio input received from the unknown speaker, thereby improving the efficiency of associating unknown users with voiceprints. A known user may be a user who has been identified, e.g., by checking-in at or near the location where, and at or soon before (e.g., 1, 5, 10, 60 minutes before) the time at which the audio input was received, or by having their voice matched to their voiceprint. A known user may also be a friend in the social-networking system 160 of another known user. Privacy settings may allow users to opt in or opt out of having the social-networking system 160 use their identities, voiceprints, and/or other information associated with them, such as their location, to identify them based on voiceprint analysis.

The following examples illustrate how, in particular embodiments, the social-networking system 160 may receive audio input from an unknown user 182, identify a candidate user of the online social network based on the audio input and other factors, and assign a voiceprint and corresponding probability to the candidate user. The voiceprint may be generated based on the audio input. In one example, a user 180's voice may be captured by a client system 130 that is itself directly associated with (e.g., owned by or registered to) the speaking user 180. In this case, the user 180 acts as both the unknown user 182 and the known seed user. For example, suppose that Julian is a user of the online social network but does not have a voiceprint associated with his online social network identity. If Julian opens a social-networking application (e.g., on his smartphone), and the application captures audio input that consistently matches the same voiceprint, then the social-networking system 160 may assign a relatively high (e.g., 85%, 90%, 95%, or the like) probability that the voiceprint corresponds to Julian. Privacy settings may allow users to opt in or opt out of having the social-networking system 160 identify them based on audio input from a device such as their smartphone or other device.

As another example, a user 182's voice may be captured by a device that is associated with a first user 180 of the user 182. In this case, the first user 180 acts as the known seed user. For example, suppose that Julian is friends with Alice and is at Alice's house. Alice has a media device 192 (e.g., a dongle connected to a TV) that listens for voice commands and receives audio input containing Alice's voice (which is recognized) along with Julian's voice (which is not recognized). The social-networking system 160 compares Julian's voice to known voiceprints for Alice's friends, but does not find a match. The social-networking system 160 may identify Julian as being associated with the captured voice, and may assign a relatively low probability (e.g., 20%, 25%, 30%, or the like) that the captured voiceprint corresponds to Julian. As a further example, the social-networking system 160 may refine or update the probability as new information is collected. For example, if the media device 192 receives Alice speaking Julian's name (e.g., Alice says "Hello, Julian"), then the probability that the captured voiceprint corresponds to Julian may be increased to medium-high, e.g., 65%, 70%, 75%, or the like. Additionally, if Julian checks-in or provides his location so the social-networking system 160 determines he is located at Alice's house, then the probability may be further increased to high, e.g., 80%, 90%, or 99%. Privacy settings may allow users to opt in or opt out of having the social-networking system 160 identify them or other users, such as their friends or connections, based on voiceprint analysis.

As another example, a user's voice may be captured by a device 190 in a public location. Suppose that Julian checks-in to a restaurant that has a BLUETOOTH beacon 190 with voice-capture capabilities. The BLUETOOTH beacon 190 detects Julian's voice, e.g., by receiving audio input that the social-networking system 160 determines contains Julian's voice, and, based on Julian performing a check-in, the social-networking system 160 may assign a medium (e.g., 40%, 50%, 60%, or the like) probability that the voiceprint is associated with Julian. Later, Yoko (a friend of Julian) shows up and checks-in to the restaurant, and the BLUETOOTH beacon 190 detects, e.g., receives audio input that the social-networking system 160 determines includes a conversation between Julian and Yoko. The probability that the voiceprint is associated with Julian may be increased to medium-high (e.g., 80%, 85%, 90%) based on Yoko checking-in, on detecting Yoko's voice, or on detecting Yoko saying Julian's name. As another example, suppose that Julian and Debbie are friends, and Julian and Debbie are shopping at a store where Debbie has checked-in. A listening device at the store, e.g., a BLUETOOTH beacon 190, receives a voice input and associates a corresponding voiceprint with Julian with a medium (e.g., 45%, 50%, 55%, or the like) probability. Later, while shopping, the listening device receives audio input that is determined to include Debbie saying Julian's name, and the probability is increased to medium-high (e.g., 75%, 80%, 85%, or the like). Then, Julian opens up a social-networking application on his client system 130 that provides his location, and the probability is accordingly increased to high (e.g., 90%, 95%, 98%, or the like). As another example, suppose that Julian is talking with Carl, who has a voiceprint stored on the social-networking system 160. Carl is checked-in to a location that has a listening device, and the listening device detects a conversation between Julian and Carl. Based on their conversation, the social-networking system 160 may assign a voiceprint to Julian. For example, Carl may say Julian's name. Or, one of them may say "how is Jill doing?", and the social-networking system 160 may determine that both Carl and Julian have a friend named Jill. As another example, if the social-networking system 160 is unable to identify an unknown user 182 with at least a threshold probability, the social-networking system 160 may send a message to a known user 180 to confirm the identity of the unknown user 182. For example, if the system determines there is a medium (e.g., 60%, 65%, or 70%) probability that an unknown user 182 from whom audio input has been received near Carl's phone is Julian, the social-networking system 160 may send a message to Carl that says "Are you talking with Julian right now?" Privacy settings may allow users to opt in or opt out of having the social-networking system 160 identify them based on voiceprint analysis or use their social-network identity or associated information, such as location, check-ins, connections, to identify them or other users of the online social network.

As still another example, a voiceprint identification may be determined based on multiple voice inputs captured by multiple (e.g., two or more) devices 130, 190, 192. For example, suppose that Julian and Sam are friends, and Julian goes to a party at Sam's house. A device at Sam's house (e.g., a media device 192 connected to Sam's TV) receives Julian's voice as well as the voices of other people at the party. Later in the week, Julian checks-in to a coffee shop, and a BLUETOOTH beacon 190 at the coffee shop receives Julian's voice and determines that it matches the voice captured at the party. The social network may then associate Julian with the captured voiceprint and assign a high (e.g., 85%, 90%, 90%, or the like) probability that the voiceprint is associated with Julian.

As another example, a voiceprint identification may be determined based on a user's behavioral patterns. For example, suppose that Julian goes to his favorite coffee shop most weekday mornings. Julian checks-in to the coffee shop, and a listening device such as a BLUETOOTH beacon 190 located there receives Julian's voice. By correlating Julian's check-ins with the location at which Julian's voice is received, the social-networking system 160 may assign a voiceprint to Julian along with a particular probability score, such as a high (e.g., 80%, 85%, 90%, or the like) score. Privacy settings may allow users to opt in or opt out of having the social-networking system 160 identify them or their voiceprint based on their behavioral patterns.

In particular embodiments, the social-networking system 160 may receive, from a client system 130 of a first user 180 of the online social network, a first audio input from an unknown user 182. In particular embodiments, the client system 130 of the first user 180 may be, e.g., a mobile device such as a smartphone, a media device 192, a BLUETOOTH beacon 190, or the like. In particular embodiments, the first user 180 may be one or more of a user logged into the client system 130, a user using an application on the client system 130, or an owner of the client system 130. In particular embodiments, the social-networking system 160 may receive identity information for the unknown user 182, generate a new voiceprint based on the first audio input, and store the new voiceprint in association with the identity information for subsequent access by the social networking system 160. Privacy settings may allow users to opt in or opt out of having the social-networking system 160 use audio input from their client system for voiceprint analysis. Although this disclosure describes receiving audio input in a particular manner, this disclosure contemplates receiving audio input in any suitable manner.

In particular embodiments, the social-networking system 160 may identify one or more candidate users, wherein each candidate user is a user of the social networking system 130 within a threshold degree of separation of a known user. Privacy settings may allow users to opt in or opt out of having the social-networking system 160 identify them as candidate users. Although this disclosure describes identifying candidate users in a particular manner, this disclosure contemplates identifying candidate users in any suitable manner.

In particular embodiments, the social-networking system 160 may calculate, for each candidate user, a probability score representing a probability that the unknown user 182 is the candidate user, wherein the probability score is based on a comparison of the first audio input to a voiceprint of the candidate user stored by the online social network, wherein each voiceprint comprises audio data for auditory identification of the candidate user. In particular embodiments, the known user may be the first user 180, the candidate users may include the first user 180, and the probability score may be proportional to a number of times the first audio input matches a particular voiceprint. In particular embodiments, the known user may be the first user 180, the candidate users may comprise one or more friends of the first user 180 within the threshold degree of separation, and the probability score may be at least low. In particular embodiments, the probability score may be determined based on a behavioral pattern of the first user 180. In particular embodiments, the probability score may be high when the behavioral pattern comprises the first user 180 periodically checking in at a location, and a listening device such as a client system 130, a BLUETOOTH beacon 190, a media device 192, or the like, detects the first user 180's voice at the location. Although this disclosure describes calculating probability scores for candidate users in a particular manner, this disclosure contemplates calculating probability scores for candidate users in any suitable manner.

In particular embodiments, the social-networking system 160 may identify one of the candidate users as being the unknown user 180 based on the calculated probability scores of the candidate users. Although this disclosure describes identifying one or the candidate users as being the unknown user in a particular manner, this disclosure contemplates identifying one or the candidate users as being the unknown user in any suitable manner.

In particular embodiments, the social-networking system 160 may receive, at the client system 130 of the first user 180, a second audio input, and may increase the probability score to at least high in response to the second audio input matching a voiceprint of the known user and the second audio input comprising a name of the candidate user spoken by the known user. In particular embodiments, the social-networking system 160 may determine that the candidate user is proximate to the known user, and increase the probability score to at least high in response to determining that the candidate user is proximate to the known user. In particular embodiments, the determining that the candidate user is proximate to the known user may comprise detecting that the candidate user has checked in at a location proximate to the known user.

In particular embodiments, the social-networking system 160 may receive, by a listening device in a public location, a second audio input, and increase the probability score to at least medium in response to detecting that the candidate user has checked in at a location proximate to the listening device, which may be, e.g., the client system 130, the BLUETOOTH beacon 190, the media device 192, or other device capable of receiving audio input. In particular embodiments, the social-networking system 160 may increase the probability score to at least high in response to detecting that the known user is located proximate to the listening device. In particular embodiments, the social-networking system 160 may detect that the known user is located proximate to the listening device by detecting that the known user has checked in at a location proximate to the listening device, detecting that the second audio input matches a voiceprint of the known user, or detecting that the second audio input comprises a name of the candidate user spoken by the known user.

Figure 4:
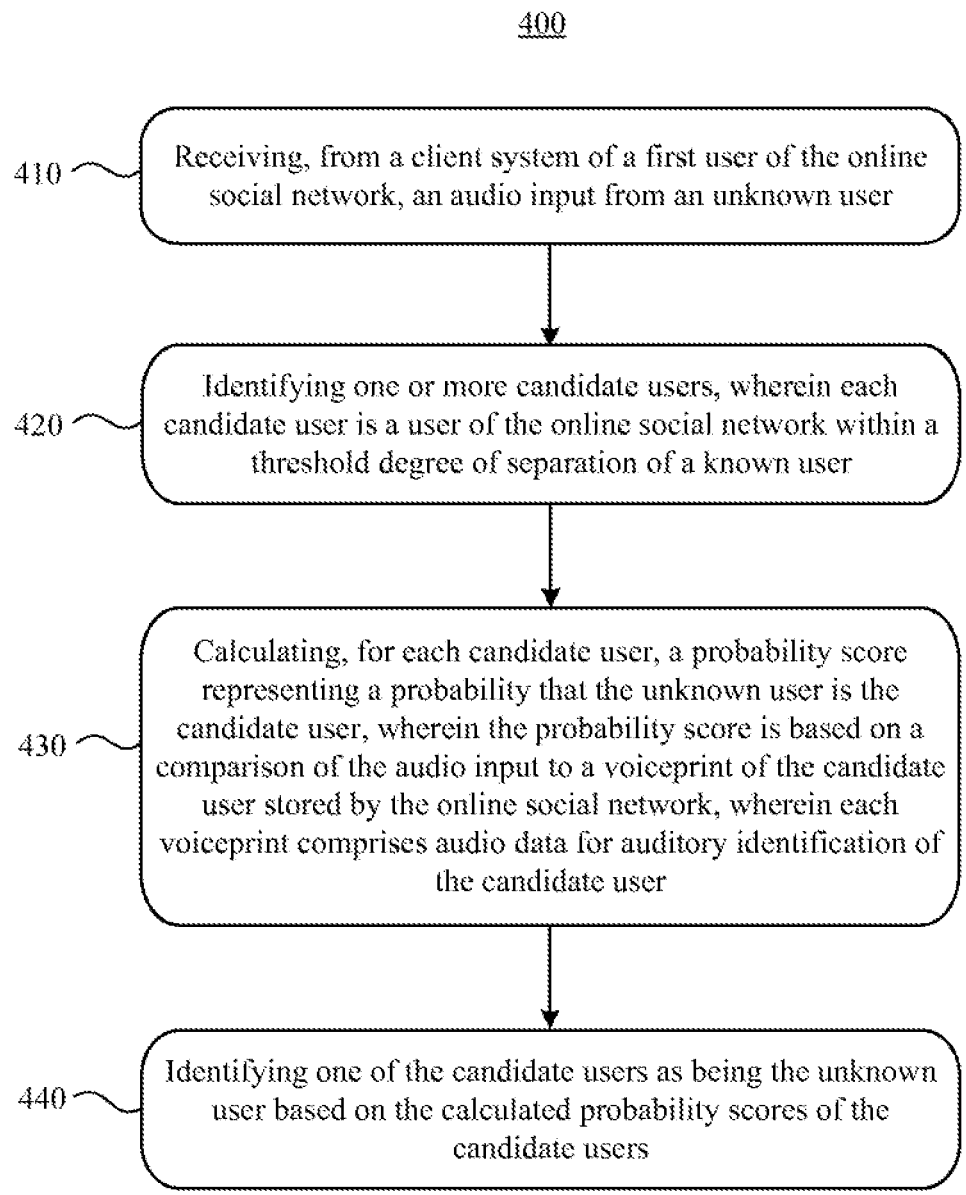
FIG. 4 illustrates an example method for associating voiceprints with unknown users and determining probabilities that the voiceprints correspond to the unknown users.

FIG. 4 illustrates an example method 400 for associating voiceprints with unknown users and determining probabilities that the voiceprints correspond to the unknown users. The method 400 may begin at step 410, where the social-networking system 160 may receive, from a client system 130 of a first user 180 of the online social network, an audio input from an unknown user 182. At step 420, the social-networking system 160 may identify one or more candidate users, wherein each candidate user is a user of the online social network within a threshold degree of separation of a known user. The unknown user may be the first user 180. At step 430, the social-networking system 160 may calculate, for each candidate user, a probability score representing a probability that the unknown user is the candidate user, wherein the probability score is based on a comparison of the audio input to a voiceprint of the candidate user stored by the online social network, wherein each voiceprint comprises audio data for auditory identification of the candidate user. At step 440, the social-networking system 160 may identify one of the candidate users as being the unknown user 180 based on the calculated probability scores of the candidate users. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for associating voiceprints with unknown users and determining probabilities that the voiceprints correspond to the unknown users including the particular steps of the method of FIG. 4, this disclosure contemplates any suitable method for associating voiceprints with unknown users and determining probabilities that the voiceprints correspond to the unknown users including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Voice Printing Authentication

In particular embodiments, the social-networking system 160 may use a user's voiceprint to authenticate the user to a client system 130 associated with the social-networking system 160. Privacy settings may allow users to opt in or opt out of allowing authentication to the social-networking system based on voiceprint analysis. For example, a user's voiceprint may be used as part of a two-factor authentication process involving (1) determining a user's identity based on biometric identification and/or social-networking information, and (2) verifying the user's identity based on a voiceprint match. This biometric voiceprint authentication process may be more secure than biometric authentication based solely on sampling physical characteristics such as thumb or retina scans. This process may also be more convenient for users than password-based authentications, since speaking an authentication code is easier than inputting a password, passcode, or PIN. The biometric voiceprint authentication process can be used to authenticate a user 180 so that the user 180 can access an application or content, such as their online social-network feed, on the client system 130.

In particular embodiments, the social-networking system 160 may begin the authentication process by receiving a biometric identifier (e.g., fingerprint, retinal scan, iris scan, or facial scan) and identifying a user 180 who matches the biometric identifier. Thus the user 180 to be authenticated, who may or may not be an authorized user of the client system 130, may provide a fingerprint or other biometric identifier instead of a username. Prior to the authentication process, an authorized user may submit one or more scans of their fingerprint(s) to the social-networking system 160, which may store the scans in association with the authorized user's identity or account information. Subsequently, to identify and/or authenticate the user 180, the user 180's fingerprint may be scanned and sent to the social-networking system 160 for comparison with the stored fingerprint scan. If the comparison indicates a match, then the user 180 has been identified as potentially being the authorized user. The social-networking system 160 may then send one or more words or a phrase, any of which may contain spoken numbers and/or letters (e.g., in a text message) for display on the client system 130. The client system 130 may display the words or phrase with a message requesting the user 180 to speak them. When the user 180 speaks, the received audio input may be received by the client system 130. Thus, the voice-inputted words or phrase may be used to authenticate the user 180 instead of a manually inputted PIN or passcode. The authorized user has previously submitted a voice sample from which the authorized user's voiceprint was generated, so the social-networking system 130 may verify that the words spoken by the user 180 match the authorized user's voiceprint. The client system 130 may determine whether the audio input contains the words or phrase spoken by the user 180, or may send the audio input to a server 162 of the social-networking system 160, which may make the determination and send the result of the determination back to the client system 130. That is, in particular embodiments, the biometric identifier supplied by a user 180 is not analyzed locally by the device 130. For example, the device 130 may capture a fingerprint scan and send the scan to the social-networking system 160 for comparison with a stored fingerprint scan. Processing the biometric identifier on the social-networking system 160 may be useful for protecting the user's privacy, e.g., by ensuring that the device does not store any biometric information that could be accessed by third-parties (e.g., other applications on the device 130). If the voiceprint matches, the social-networking system 160 grants access, for example, to the client system 130 or to the identified user's social-network feed. The biometric identifier is similar to a user name or user identifier of the user 180, and the user 180's voice is similar to a password. Privacy settings may allow users to opt in or opt out of allowing their biometric information to be sent to, processed by, and/or stored on the social-networking system.

In particular embodiments, the words or phrase supplied to the user 180 may be selected at random or may be based on words that the authorized user has previously spoken and have been captured by the social-networking system 160. The words or phrase may be, for example, a small random number (e.g., 2, 3, or 4 digits) or a small number of randomly-selected words (e.g., 1, 2, or 3 words). To prevent an unauthorized user from impersonating an authorized user (e.g., by recording the authorized user saying a password), the words may be changed or selected at random. For example, the words or phrase may change at periodic times or each time a word or phrase is supplied to the user 180. Additionally, the social-networking system 160 may apply a machine learning model to the user 180's voiceprint. For example, the authorized user may grant permission for an application to sample the authorized user's voice, and the social-networking system 160 may periodically receive samples of the authorized user's voice (e.g., while the authorized user is using the client system 130) as audio input and update a corresponding voiceprint, a set of words, or learning model. The learning model may recognize words or phrases spoken by the user 180 as being in the authorized user's voice, and may identify the user 180 as the authorized user based on their voice, e.g., with a high degree of confidence, without providing a specific word or phrase for the user 180 to speak. The social-networking system 160 may use the learning model to verify that the authorized user has spoken the phrase. That is, the learning model may enable identification of users based on their voices, so that the specific word or phrase, such as a random word or number, need not be used for user identification.

In another embodiment, the first step of the authentication process may involve the user 180's location or the identities of one or more other users who are located near the user 180. For example, if another user located near a first user 180's client system is authenticated and is the first user 180's friend, then the social-networking system may proceed through the first step of the authentication process based on that information. This approach may be used, for example, for a first user 180 whose client system 130 is locked and has a social-networking application running in the background.

In particular embodiments, a user 180 may gain access to a friend's client system 130 based on two-factor authentication. For example, a user 180 may want to access their own social-networking feed on a friend's client system 130. The user 180 may supply his or her biometric identifier (e.g., fingerprint) to the friend's client system 130, and the friend's client system 130 may send the fingerprint scan to the social-networking system 160. The social-networking system 160 may identify the user 180 (e.g., by comparing the supplied fingerprint scan to scans associated with users connected to the owner of the client system 130) and verify that the user 180 is a friend of the client system 130's owner. The social-networking system 160 may then send a text message to the client system 130 containing a word or phrase which the user 180 must speak in order to gain access to the client system 130. Once the user 180 is authenticated on their friend's client system 130, the user 180 may be granted access to only certain features or applications (e.g., the user 180 may only be able to access their own social-networking feed). If a user 180 attempts to gain access to another person's client system 130 (e.g., by submitting their fingerprint), and they are not friends in the social networking system 160, the social-networking system 130 may deny access to the user 180. Privacy settings may allow users to opt in or opt out of allowing access to their devices by their friends or other users.

In particular embodiments, the social-networking system 160 may receive, from a client system 130 of a first user 180, a biometric input from a second user 182, wherein the biometric input is used to identify the second user 182 as a user of the online social network. In particular embodiments, the biometric input from the second user 182 may include one or more of a fingerprint, hand shape, retina pattern, iris pattern, finger vein pattern, faceprint, keystroke pattern, DNA sample, handwritten signature, another suitable biometric input, or any combination thereof. Privacy settings may allow users to opt in or opt out of allowing their client system to be used for authentication or identification of other users, and may also allow users to opt out of allowing their identities to be authenticated by other users' client systems. Although this disclosure describes receiving biometric input in a particular manner, this disclosure contemplates receiving biometric input in any suitable manner.

In particular embodiments, the social-networking system 160 may determine a relationship status between the first user 180 and the second user 182 within the online social network. The relationship status may be, for example, existence or non-existence of a friend relationship or other type of connection in the social graph between two users. Although this disclosure describes determining a relationship status between two users in a particular manner, this disclosure contemplates determining a relationship status between two users in any suitable manner.

In particular embodiments, the social-networking system 160 may send, to the client system 130, a temporary personal identifier for presentation to the second user 180 if the relationship status between the first user 180 and the second user 182 satisfies threshold criteria. As an example and not by way of limitation, the temporary personal identifier may be a number, word, or phrase. A particular value of the temporary personal identifier may be valid for a limited time period, e.g., 10 minutes, 30 minutes, or one hour. In particular embodiments, the social-networking system 160 may receive, from the client system 130 in response to the presentation of the temporary personal identifier to the second user 182, an audio input from the second user 182. In particular embodiments, the social-networking system 160 may determine, based on a comparison of the audio input to a voiceprint of the second user 182 stored by the online social network, wherein the voiceprint comprises audio data for auditory identification of the second user 182: whether the audio input was spoken by the second user 182; and whether the audio input comprises the temporary personal identifier spoken by the second user 182. Optionally, the temporary personal identifier may be invalidated after the limited time period described above, so that authentication fails if the limited time period has passed since the temporary personal identifier was generated, even if the second user 182 supplies the correct temporary personal identifier. Although this disclosure describes generating, sending, and receiving a temporary personal identifier for presentation to a user in a particular manner, this disclosure contemplates send, to the client system, a temporary personal identifier for presentation to a user in any suitable manner.

In particular embodiments, the relationship status between the first user 180 and the second user 182 may satisfy the threshold criteria when the first user 180 is within a threshold degree of separation of the second user 182 within the online social network. In particular embodiments, the relationship status between the first user 180 and the second user 182 may satisfy the threshold criteria when the first user 180's privacy settings allow the second user 182 to access the client system 130. In particular embodiments, the first user 182 may access the online social network without providing an authentication code for the client system 130. Privacy settings may allow users to opt in or opt out of allowing authentication to the social-networking system based on voiceprint analysis.

In particular embodiments, the social-networking system 160 may authenticate the second user 182 to access the online social network via the client system 130 if the audio input is determined to be spoken by the second user 182 and comprise the temporary personal identifier spoken by the second user 182. In particular embodiments, the social-networking system 160 may access one or more third-party applications on the client system 130 in response to authenticating the second user 182. In particular embodiments, authenticating the second user 182 to access the social-networking system 160 via the client system 130 may grant the second user 182 access to the online social network using a user identity associated with the second user 182. In particular embodiments, authenticating the second user 182 may grant the second user 182 access to a social-networking feed associated with the second user 182. In particular embodiments, authenticating the second user 182 may grant the second user 182 access to information about friends of the second user 182. In particular embodiments, the access to the online social network granted to the second user 182 may be subject to social-networking visibility restrictions associated with the second user 182. In particular embodiments, authenticating the second user 182 may comprise granting the second user 182 access to the online social network account of the second user 182. Privacy settings may allow users to opt in or opt out of allowing authentication and access to their online social network account to the social-networking system based on biometric information and/or voiceprint analysis.

Figure 5:
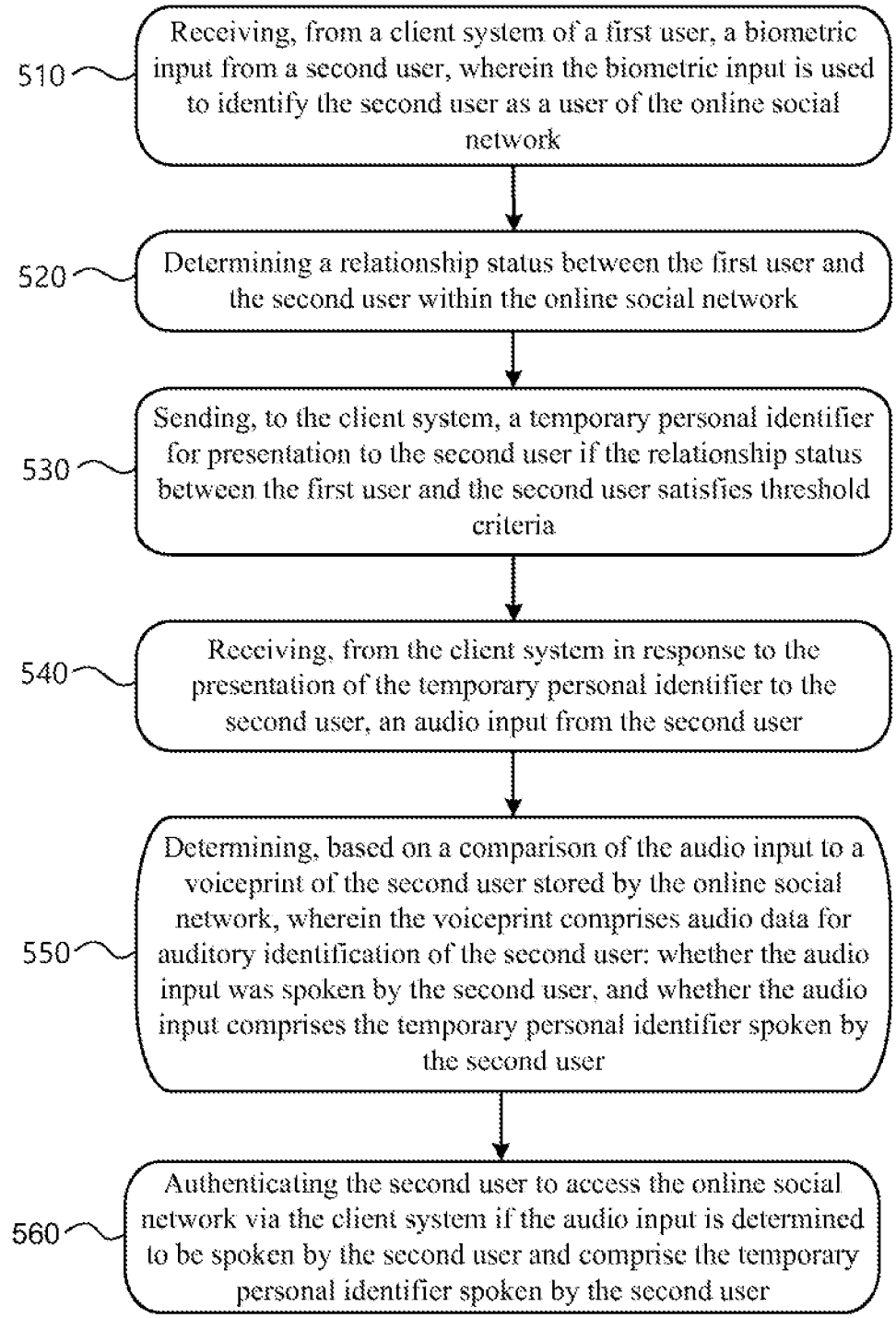
FIG. 5 illustrates an example method for using biometric identification and a user's voiceprint to authenticate the user.

FIG. 5 illustrates an example method 500 for using biometric identification and a user 182's voiceprint to authenticate the user 182. The method 500 may begin at step 510, where the social-networking system 160 may receive, from a client system 130 of a first user 180, a biometric input from a second user 182, wherein the biometric input is used to identify the second user as a user of the online social network. At step 520, the social-networking system 160 may determine a relationship status between the first user 180 and the second user 182 within the online social network. At step 530, the social-networking system 160 may send, to the client system 130, a temporary personal identifier for presentation to the second user 182 if the relationship status between the first user 180 and the second user 182 satisfies threshold criteria. At step 540, the social-networking system 160 may receive, from the client system 130 in response to the presentation of the temporary personal identifier to the second user 182, an audio input from the second user 182. At step 550, the social-networking system 160 may determine, based on a comparison of the audio input to a voiceprint of the second user 182 stored by the online social network, wherein the voiceprint comprises audio data for auditory identification of the second user 182: whether the audio input was spoken by the second user, and whether the audio input comprises the temporary personal identifier spoken by the second user 182. At step 560, the social-networking system 160 may authenticate the second user 182 to access the online social network via the client system 130 if the audio input is determined to be spoken by the second user 182 and comprise the temporary personal identifier spoken by the second user 182.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for using biometric identification and a user's voiceprint to authenticate the user including the particular steps of the method of FIG. 5, this disclosure contemplates any suitable method for using biometric identification and a user's voiceprint to authenticate the user including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Voice Printing Presence Detection

In particular embodiments, the social-networking system 160 may identify users from their voiceprints and provide customized content to the identified users. Privacy settings may allow users to opt in or opt out of having the social-networking system identify them or customize content for the user based on voiceprint analysis. A client system 130 associated with the social-networking system 160 may detect one or more people speaking, and the people speaking may be identified as users based on comparison of their voices to voiceprints stored by the social-networking system 160. Upon identifying one or more of the people as users of the social-networking system 160, the social-networking system 160 may provide customized content to the identified users based on their social-networking information. The customized content may be personalized to match the interests of the identified users, and may include advertisements, news feeds, push notifications, place tips, coupons, or suggestions.

In particular embodiments, when multiple speakers are detected in audio input received by a client system 130 of the social-networking system 160, the social-networking system 160 may use voiceprint analysis to identify social network users 182 who are connected to a known seed user, such as an authenticated user 180, e.g., the owner of a listening phone, and then send content to one or more of the social network users based on their interests. For example, suppose that two users, Marsha and Jan, are friends and are watching TV at Marsha's house. Marsha is an authenticated user of the TV at her house. A media device 192 associated with the social-networking system 160 (e.g., a dongle in communication with the TV) receives Jan's voice, and the social-networking system 160 identifies Jan based on her voiceprint and on her social-graph connection to Marsha. Content or advertisements may then be provided to the users (e.g., to the TV, to Jan or Marsha's phone, etc.), and the content or advertisements may be customized to the interests of Marsha and Jan (e.g., the TV recommends a show or displays an advertisement for a product that both users are interested in). Content or advertisements may be provided to a group of three or more users if at least one of the users is an authenticated user 180.

In particular embodiments, the social-networking system 160 may use a process similar to that described above when the client system 190 that detects speaking users is not authenticated to any of the speakers (for example, a BLUETOOTH beacon 190 in a public place). As an example, suppose that Velma and Daphne walk into a store. Velma is known to be at the store (e.g., she opens a mobile application from the store on her smartphone). A BLUETOOTH beacon 190 at the store may then detect Daphne speaking, and the social-networking system 160 may identify Daphne based on a voiceprint analysis of Daphne's voice and based on Velma and Daphne being socially connected. This identification may occur even if the social-networking system 160 does not otherwise detect Daphne's presence in the store (e.g., because location services, GPS, or the like are disabled or nonfunctional on her phone). The social-networking system 160 may then send content or advertisements (e.g., a 2-for-1 coupon to the store; or an ad for a nearby store that may have relevance to both users) to Velma's and/or Daphne's device. Thus, in Daphne's case, content customized for Daphne's location may be sent to her despite her location services or GPS being disabled or non-functional. Privacy settings may allow users to opt in or opt out of having the social-networking system identify them or customize content for the user based on voiceprint analysis when they are identified by devices that are not authenticated to them, such as devices in public places.

In particular embodiments, identification of users may also be applied to an event, in which case the event may correspond to a seed concept. For example, suppose that a restaurant invites people to an event, and 100 users confirm their attendance through the social-networking system 160. The restaurant has a BLUETOOTH beacon 192, and users may be identified by comparing their captured voices to stored voiceprints for the 100 attendees (as well as friends of the 100 attendees). In this way, the social-networking system 160 need not compare captured voices to the voiceprints of social-network users who are not attendees at the event. Instead, the search space for the voiceprint comparison may be reduced from a large number of users of the social-networking system 160 to the relatively small number of users who are associated with the event, such as the users who have confirmed their attendance on the social-networking system 160, and optionally their friends. Once attendees are identified, the social-networking system 160 may present information to them that is tailored to their interests. Privacy settings may allow users to opt in or opt out of allowing identification of events they create or manage in the social-networking system based on voiceprint analysis.

While the processes described above may involve a seed user or a seed concept, it is possible that initially there are no authenticated users. For example, suppose a user walks into a store and the location services or GPS on the user's client system 130 are not active (e.g., BLUETOOTH is turned off and the client system 130 does not have a good GPS signal). The BLUETOOTH beacon 190 in the store receives the user's voice and the social-networking system 160 identifies the user based on a comparison to voiceprints in the system. The system may compare the user's voice with many voiceprints to find a match. Alternatively, the system 160 may apply filtering criteria based on time or location, e.g., to only consider voiceprints of users who have a recent location within a particular distance of the BLUETOOTH beacon.

In particular embodiments, the social-networking system 160 may receive, from a client system 130 at a first location, an audio input from an unknown user 182. Although this disclosure describes receiving an audio input in a particular manner, this disclosure contemplates receiving an audio input in any suitable manner. In particular embodiments, the social-networking system 160 may identify a first user 180 of the online social network who is proximate to the first location. As an example and not by way of limitation, the online social network may receive the identity of a user proximate to the first location by searching the known locations of users for locations that are within a threshold distance of the first location. The known locations of a user may be determined by the online social network based on the user's use of a client system 130 that has sent its geographical location to the online social network, based on the user checking-in at the geographical location, based on identifying the user's voice at the geographical location via voiceprint analysis, or based on other techniques described herein. Although this disclosure describes identifying a user proximate to a location in a particular manner, this disclosure contemplates identifying a user proximate to a location in any suitable manner.

In particular embodiments, the social-networking system 160 may identify the unknown user as a second user 182 of the online social network based on a comparison of the audio input to one or more voiceprints of one or more candidate users stored by the online social network, respectively, wherein each voiceprint comprises audio data for auditory identification of a unique user of the online social network, and wherein each candidate user is within a threshold degree of separation of the first user 180 within the online social network. Although this disclosure describes identifying the unknown user in a particular manner, this disclosure contemplates identifying the unknown user as a second in any suitable manner. Privacy settings may allow users to opt in or opt out of having the social-networking system use their voiceprint or interests to identify themselves or other users based on voiceprint analysis.

In particular embodiments, the social-networking system 160 may send customized content to one or more of the first user 180 or the second user 182 based on their social-networking information. In particular embodiments, the customized content may comprise content associated with the first location. In particular embodiments, the social-networking system 160 may generate the customized content based on one or more interests of the first user 180 or the second user 182, wherein the one or more interests are received from the online social network. In particular embodiments, the customized content may comprise content having one or more topics that match the interests of the first user 180 or the second user 182. In particular embodiments, the customized content may comprise advertisements, news feeds, push notifications, place tips, coupons, suggestions, or a combination thereof. In particular embodiments, the client system 130 may be a mobile phone, a BLUETOOTH beacon 190, or a media device 192 operable to receive audio input. In particular embodiments, the media device 192 may be a dongle in communication with a television. In particular embodiments, the first and second users may be associated with an event on the online social network. In particular embodiments, the first and second users have confirmed their attendance at the event to the online social network. Although this disclosure describes generating and sending customized content in a particular manner, this disclosure contemplates generating and sending customized content in any suitable manner.

Figure 6:
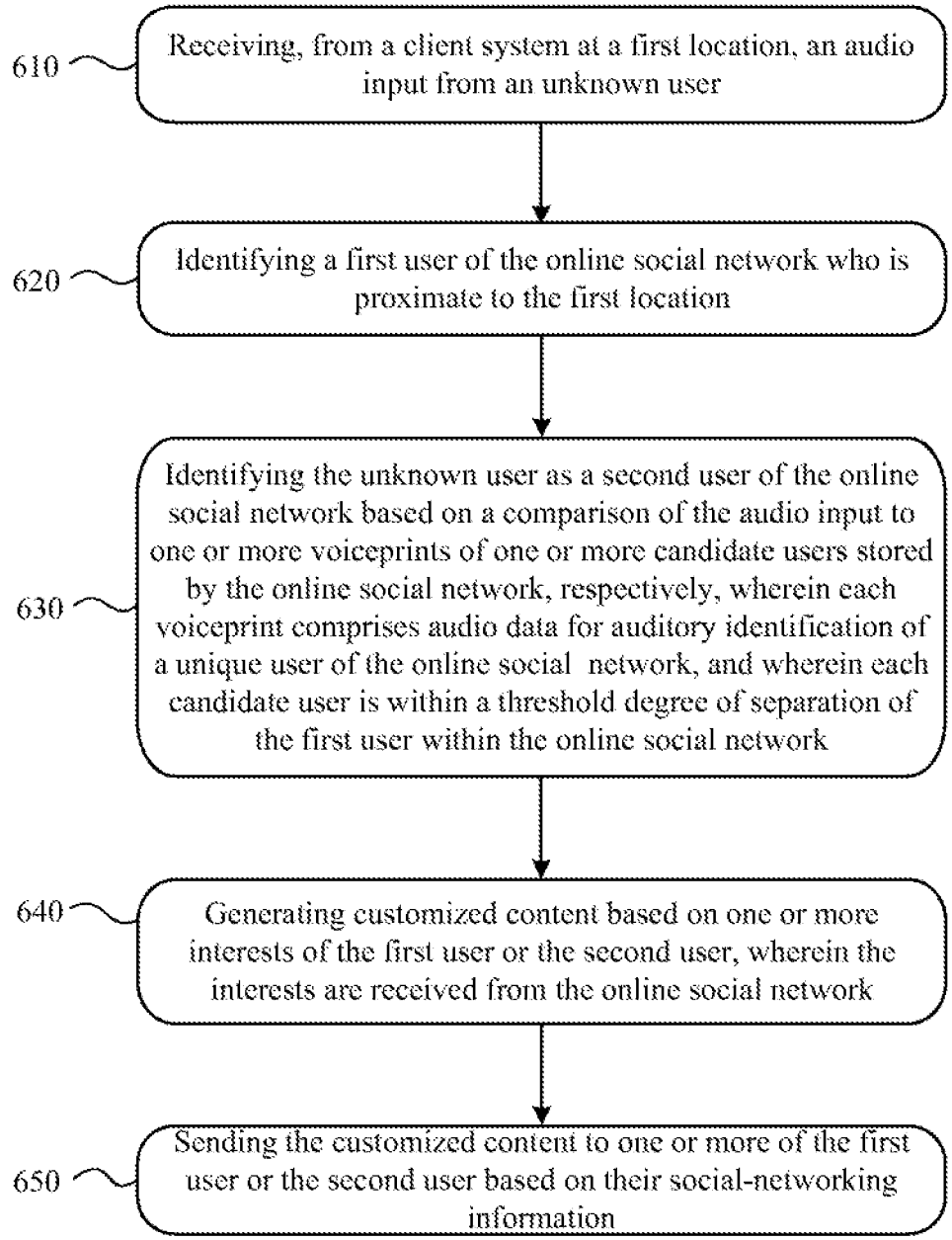
FIG. 6 illustrates an example method for identifying users from their voiceprints and providing customized content to the identified users.

FIG. 6 illustrates an example method 600 for identifying users from their voiceprints and providing customized content to the identified users. The method may begin at step 610, where the social-networking system 160 may receive, from a client system 130 at a first location, an audio input from an unknown user. At step 620, the social-networking system 160 may identify a first user 180 of the online social network who is proximate to the first location. At step 630, the social-networking system 160 may identify the unknown user as a second user 182 of the online social network based on a comparison of the audio input to one or more voiceprints of one or more candidate users stored by the online social network, respectively, wherein each voiceprint comprises audio data for auditory identification of a unique user of the online social network, and wherein each candidate user is within a threshold degree of separation of the first user 180 within the online social network. At step 640, the social-networking system 160 may generate customized content based on one or more interests of the first user 180 or the second user 182, wherein the interests are received from the online social network. At step 650, the social-networking system 160 may send the customized content to one or more of the first user 180 or the second user 182 based on their social-networking information. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for identifying users from their voiceprints and providing customized content to the identified users including the particular steps of the method of FIG. 6, this disclosure contemplates any suitable method for identifying users from their voiceprints and providing customized content to the identified users including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 204 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 200. A privacy setting may be specified for one or more edges 206 or edge-types of the social graph 200, or with respect to one or more nodes 202, 204 or node-types of the social graph 200. The privacy settings applied to a particular edge 206 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 204 connected to a user node 202 of the first user by an edge 206. The first user may specify privacy settings that apply to a particular edge 206 connecting to the concept node 204 of the object, or may specify privacy settings that apply to all edges 206 connecting to the concept node 204. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 may access such information in order to provide a particular function or service to the first user, without the social-networking system 160 having access to that information for any other purposes. Before accessing, storing, or using such objects or information, the social-networking system 160 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160.

In particular embodiments, a user may specify whether particular types of objects or information associated with the first user may be accessed, stored, or used by the social-networking system 160. As an example and not by way of limitation, the first user may specify that images sent by the first user through the social-networking system 160 may not be stored by the social-networking system 160. As another example and not by way of limitation, a first user may specify that messages sent from the first user to a particular second user may not be stored by the social-networking system 160. As yet another example and not by way of limitation, a first user may specify that all objects sent via a particular application may be saved by the social-networking system 160.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 may provide default privacy settings with respect to each device, system, or application, and/or the first user may be prompted to specify a particular privacy setting for each context. As an example and not by way of limitation, the first user may utilize a location-services feature of the social-networking system 160 to provide recommendations for restaurants or other places in proximity to the user. The first user's default privacy settings may specify that the social-networking system 160 may use location information provided from a client system 130 of the first user to provide the location-based services, but that the social-networking system 160 may not store the location information of the first user or provide it to any third-party system 170. The first user may then update the privacy settings to allow location information to be used by a third-party image-sharing application in order to geo-tag photos.

In particular embodiments, privacy settings may allow a user to specify whether mood or sentiment information associated with the user may be determined, and whether particular applications or processes may access, store, or use such information. The privacy settings may allow users to opt in or opt out of having mood or sentiment information accessed, stored, or used by specific applications or processes. The social-networking system 160 may predict or determine a mood or sentiment associated with a user based on, for example, inputs provided by the user and interactions with particular objects, such as pages or content viewed by the user, posts or other content uploaded by the user, and interactions with other content of the online social network. In particular embodiments, the social-networking system 160 may use a user's previous activities and calculated moods or sentiments to determine a present mood or sentiment. A user who wishes to enable this functionality may indicate in their privacy settings that they opt in to the social-networking system 160 receiving the inputs necessary to determine the mood or sentiment. As an example and not by way of limitation, the social-networking system 160 may determine that a default privacy setting is to not receive any information necessary for determining mood or sentiment until there is an express indication from a user that the social-networking system 160 may do so. By contrast, if a user does not opt in to the social-networking system 160 receiving these inputs (or affirmatively opts out of the social-networking system 160 receiving these inputs), the social-networking system 160 may be prevented from receiving, collecting, logging, or storing these inputs or any information associated with these inputs. In particular embodiments, the social-networking system 160 may use the predicted mood or sentiment to provide recommendations or advertisements to the user. In particular embodiments, if a user desires to make use of this function for specific purposes or applications, additional privacy settings may be specified by the user to opt in to using the mood or sentiment information for the specific purposes or applications. As an example and not by way of limitation, the social-networking system 160 may use the user's mood or sentiment to provide newsfeed items, pages, friends, or advertisements to a user. The user may specify in their privacy settings that the social-networking system 160 may determine the user's mood or sentiment. The user may then be asked to provide additional privacy settings to indicate the purposes for which the user's mood or sentiment may be used. The user may indicate that the social-networking system 160 may use his or her mood or sentiment to provide newsfeed content and recommend pages, but not for recommending friends or advertisements. The social-networking system 160 may then only provide newsfeed content or pages based on user mood or sentiment, and may not use that information for any other purpose, even if not expressly prohibited by the privacy settings.

In particular embodiments, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular embodiments, for particular objects or information having privacy settings specifying that they are ephemeral, the social-networking system 160 may be restricted in its access, storage, or use of the objects or information. The social-networking system 160 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the social-networking system 160 may temporarily store the message in a data store 164 until the second user has viewed or downloaded the message, at which point the social-networking system 160 may delete the message from the data store 164. As another example and not by way of limitation, continuing with the prior example, the message may be stored for a specified period of time (e.g., 2 weeks), after which point the social-networking system 160 may delete the message from the data store 164.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160. The user's privacy settings may specify that such information may be used only for particular processes, such as authentication, and further specify that such information may not be shared with any third-party system 170 or used for other processes or applications associated with the social-networking system 160. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 160 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 160 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system 160 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 160 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 160 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 160 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 160 may send a reminder to the user to confirm his or her privacy settings every six months or after every ten photo posts. In particular embodiments, privacy settings may also allow users to control access to the objects or information on a per-request basis. As an example and not by way of limitation, the social-networking system 160 may notify the user whenever a third-party system 170 attempts to access information associated with the user, and require the user to provide verification that access should be allowed before proceeding.

Systems and Methods

Figure 7:
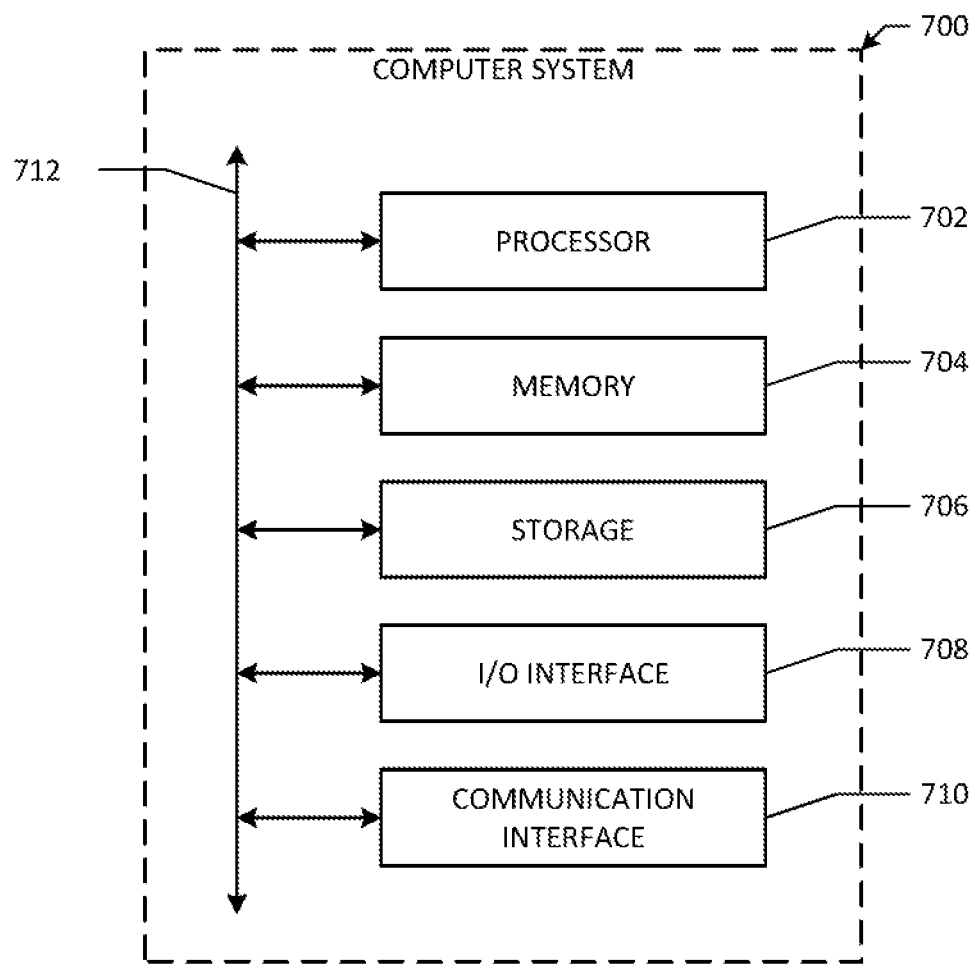
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   receiving, from a client system of a first user, an audio input from a second user, wherein a first user profile corresponding to the first user comprises first interest information associated with the first user, wherein a second user profile corresponding to the second user comprises second interest information associated with the second user;
   determining, based on a comparison of the audio input to a voiceprint of the second user, wherein the voiceprint comprises audio data for auditory identification of the second user, whether the audio input comprises a query related to the first interest information and the second interest information; and
   sending, to the client system, customized content for presentation to the second user, wherein the content is customized using the first interest information and the second interest information.

2. The method of claim 1, further comprising:
   determining a relationship status between the first user and the second user; and
   sending, to the client system, a temporary personal identifier for presentation to the second user if the relationship status between the first user and the second user satisfies threshold criteria.

3. The method of claim 2, wherein the relationship status between the first user and the second user satisfies the threshold criteria when the first user is within a threshold degree of separation of the second user within an online social network.

4. The method of claim 2, wherein the relationship status between the first user and the second user satisfies the threshold criteria when the privacy settings of the first user allow the second user to access the client system.

5. The method of claim 1, further comprising:
   authenticating the second user to access an online account associated with the second user via the client system.

6. The method of claim 5, wherein the authenticating the second user to access an online account associated with the second user via the client system grants the second user access to a social-networking feed associated with the second user.

7. The method of claim 5, wherein the authenticating the second user grants the second user access to information about friends of the second user.

8. The method of claim 5, further comprising accessing one or more third-party applications on the client system in response to authenticating the second user.

9. The method of claim 5, wherein the authenticating the second user grants the second user access to an online social network.

10. The method of claim 9, wherein the access to the online social network granted to the second user is subject to social-networking visibility restrictions associated with the second user.

11. One or more computer-readable non-transitory storage media embodying software that is operable when executed to:
    receive, from a client system of a first user, an audio input from a second user, wherein a first user profile corresponding to the first user comprises first interest information associated with the first user, wherein a second user profile corresponding to the second user comprises second interest information associated with the second user;
    determine, based on a comparison of the audio input to a voiceprint of the second user, wherein the voiceprint comprises audio data for auditory identification of the second user, whether the audio input comprises a query related to the first interest information and the second interest information; and
    send, to the client system, customized content for presentation to the second user, wherein the content is customized using the first interest information and the second interest information.

12. The media of claim 11, further comprising:
    determine a relationship status between the first user and the second user; and send, to the client system, a temporary personal identifier for presentation to the second user if the relationship status between the first user and the second user satisfies threshold criteria.

13. The media of claim 12, wherein the relationship status between the first user and the second user satisfies the threshold criteria when the first user is within a threshold degree of separation of the second user within an online social network.

14. The media of claim 12, wherein the relationship status between the first user and the second user satisfies the threshold criteria when the privacy settings of the first user allow the second user to access the client system.

15. The media of claim 11, further comprising:
authenticating the second user to access an online account associated with the second user via the client system.

16. A system comprising: one or more processors; and a non-transitory memory coupled to the processors comprising instructions executable by the processors, the processors operable when executing the instructions to:
receive, from a client system of a first user, an audio input from a second user, wherein a first user profile corresponding to the first user comprises first interest information associated with the first user, wherein a second user profile corresponding to the second user comprises second interest information associated with the second user;
determine, based on a comparison of the audio input to a voiceprint of the second user, wherein the voiceprint comprises audio data for auditory identification of the second user, whether the audio input comprises a query related to the first interest information and the second interest information; and
send, to the client system, customized content for presentation to the second user, wherein the content is customized using the first interest information and the second interest information.

17. The system of claim 16, further comprising:
determine a relationship status between the first user and the second user; and
send, to the client system, a temporary personal identifier for presentation to the second user if the relationship status between the first user and the second user satisfies threshold criteria.

18. The system of claim 17, wherein the relationship status between the first user and the second user satisfies the threshold criteria when the first user is within a threshold degree of separation of the second user within an online social network.

19. The system of claim 17, wherein the relationship status between the first user and the second user satisfies the threshold criteria when the privacy settings of the first user allow the second user to access the client system.

20. The system of claim 16, further comprising:
authenticating the second user to access an online account associated with the second user via the client system.

* * * * *